United States Patent
Yu et al.

(10) Patent No.: US 7,870,350 B1
(45) Date of Patent: Jan. 11, 2011

(54) WRITE BUFFER FOR READ-WRITE INTERLOCKS

(75) Inventors: Shu-Yi Yu, Santa Clara, CA (US); James Michael O'Connor, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 353 days.

(21) Appl. No.: 11/759,539

(22) Filed: Jun. 7, 2007

(51) Int. Cl.
   *G06F 13/00* (2006.01)
(52) U.S. Cl. .................. 711/155; 711/154; 711/156
(58) Field of Classification Search ................... 711/156
   See application file for complete search history.

(56) References Cited

U.S. PATENT DOCUMENTS

| | | | | |
|---|---|---|---|---|
| 4,757,439 | A * | 7/1988 | Stinson et al. | 711/156 |
| 5,471,591 | A * | 11/1995 | Edmondson et al. | 712/217 |
| 5,590,352 | A * | 12/1996 | Zuraski et al. | 712/23 |
| 5,737,629 | A * | 4/1998 | Zuraski et al. | 712/23 |
| 5,751,981 | A * | 5/1998 | Witt et al. | 712/204 |
| 5,867,682 | A * | 2/1999 | Witt et al. | 712/210 |
| 6,483,516 | B1 * | 11/2002 | Tischler | 345/552 |
| 6,604,190 | B1 * | 8/2003 | Tran | 712/207 |
| 6,993,630 | B1 * | 1/2006 | Williams et al. | 711/137 |
| 2006/0184742 | A1 * | 8/2006 | Clark et al. | 711/133 |

OTHER PUBLICATIONS

Hierarchical Execution to Speed Up Pipeline Interlock in Mainframe Computers, Yooichi Shintani et al, IEEE Transactions on Computers, May 1996, vol. 45, No. 5, p. 589-599.*
Eliminating Interlocks in Deeply Pipelined Processors by Delay Enforced Multistreaming; McMcrackin, Daniel C.; IEEE Transactions on Computers; Oct. 1991, vol. 40, No. 10, p. 1125-1132.*
Architectural Tradeoffs in the Design of MIPS-X; Chow et al.; Proceedings of the 14th annual International Symposium on Computer Architecture; ACM; 1987; p. 300-308.*

* cited by examiner

*Primary Examiner*—Sanjiv Shah
*Assistant Examiner*—Daniel Chappell
(74) *Attorney, Agent, or Firm*—Patterson & Sheridan, LLP

(57) ABSTRACT

A write buffer for read-write interlocks improves memory access performance by minimizing the latency needed to avoid a read-after-write hazard when a read follows a write to the same memory location. Rather than waiting until a write has been stored in the memory location, the write buffer provides an acknowledgement signal before the data has been stored in memory in order for a subsequent read of the memory location to proceed. The write buffer merges the data to be written with any data that is stored in memory for the read request to return the current data for the read request.

20 Claims, 9 Drawing Sheets

WRITE BUFFER FOR READ-WRITE INTERLOCKS

BACKGROUND OF THE INVENTION

1. Field of the Invention

The present invention generally relates to avoiding read after write hazards when a write buffer is used and more specifically to reducing the latency of read after write interlocks.

2. Description of the Related Art

Current processing systems interlock reads that follow writes to the same address until the write transaction is completed, i.e. the write data is stored in memory, to prevent read after write (RAW) hazards. Therefore, the read transaction is delayed while the write transaction is pending and the latency incurred by delaying the read transaction reduces the memory transaction throughput. The latency may be even greater when one or more write transactions are cached in order to accumulate smaller write transactions to perform a block write operation.

Accordingly, what is needed in the art is a system and method for reducing the latency of read after write interlocks to improve memory transaction throughput.

SUMMARY OF THE INVENTION

A write buffer for read-write interlocks improves memory access performance by minimizing the latency needed to avoid a RAW hazard when a read follows a write to the same memory location. Rather than waiting until a write has been stored in the memory location, the write buffer provides an early acknowledgement signal indicating that a subsequent read can proceed when a write to the memory location is queued for output to the memory. The read request is allowed to pass the write request and the write buffer is read to obtain the queued write data. When only a portion of the data specified by the read request is queued, the read request passes the write request and accesses memory to obtain any data that is not queued in the write buffer. The write buffer then merges the portion of data with the data read from memory to return the current data for the read request. In either case, the latency of read after write interlocks is reduced and memory transaction throughput may be improved.

Various embodiments of a method of the invention for reducing read-write interlock latency include receiving a write request that specifies a memory location and write data, storing the memory location in a tag storage resource, and storing the write data as pending write data in a write data buffer. The memory location is compared to any other memory locations that are stored in the tag storage resource and an early acknowledgement signal is output that indicates a read request for the memory location can be processed when the memory location does not match another memory location that is stored in the tag storage resource.

Various embodiments of the invention for reducing read-write interlock latency include a memory partition unit that is configured to output acknowledge signals that indicate a write request for a memory location has been processed and the memory location can be read. The memory partition unit includes a write data buffer, a tag storage resource, and an arbitration unit. The write data buffer is configured to store write data that is specified by write requests as pending write data. The tag storage resource is configured to store memory locations that are specified by the write requests, compare the new memory location for a received memory request to any other memory locations that are stored in the tag storage resource, and output an early acknowledgement signal that indicates a read request for the memory location can be processed when the new memory location does not match another memory location that is stored in the tag storage resource to reduce the read-write interlock latency. The arbitration unit is coupled to the write data buffer and the tag storage resource and configured to select and output read and write requests to memory.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
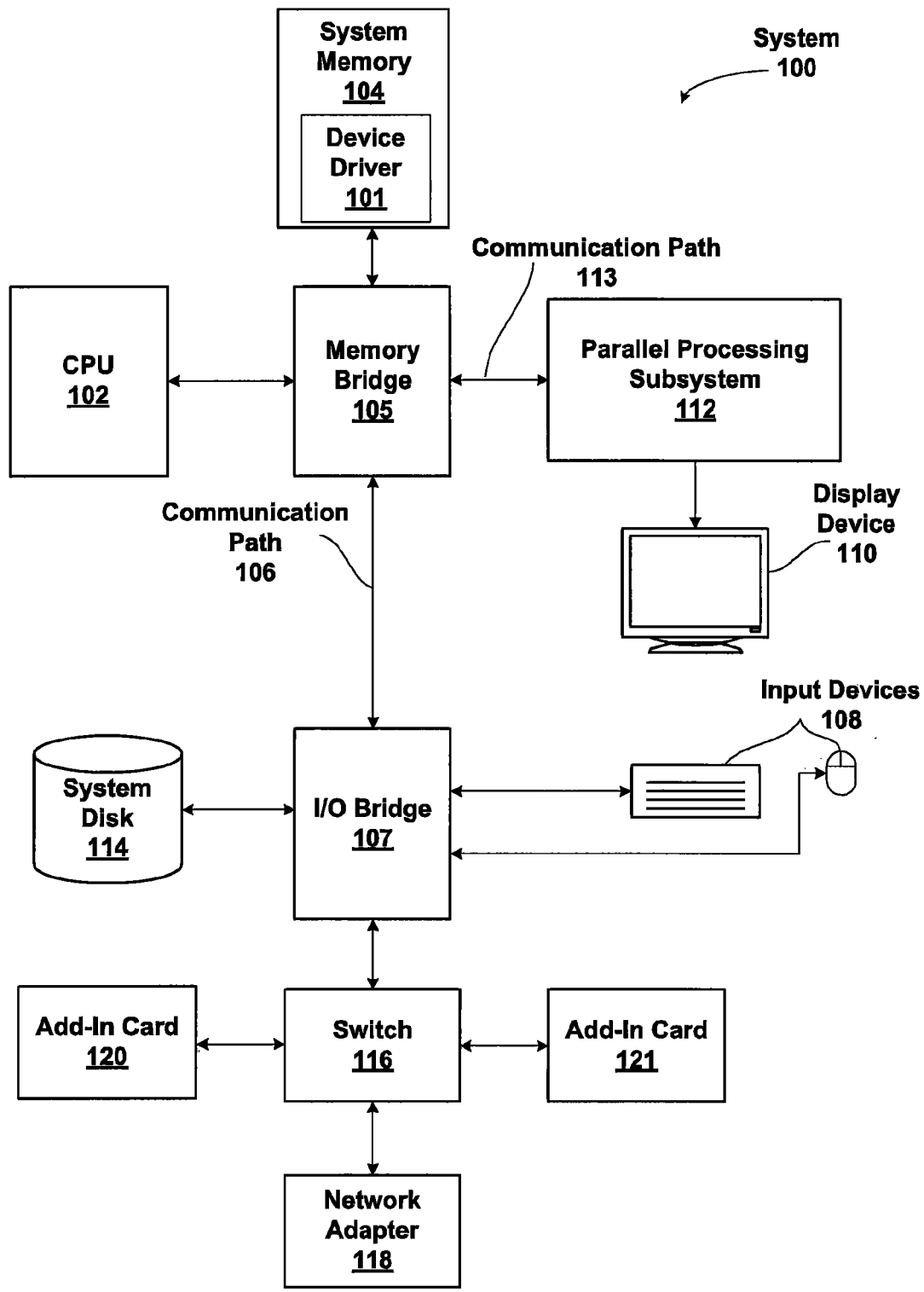
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. System memory 104 includes a device driver 101 that is configured to provide the location of data and program instructions to parallel processing subsystem 112. The data and program instructions may be stored in system memory 104 or memory within other devices of system 100. Device driver 101 is executed by CPU 102 to translate instructions for execution by parallel processing subsystem 112 based on the specific capabilities of parallel processing subsystem 112. The instructions may be specified by an application programming interface (API) which may be a conventional graphics API such as Direct3D or OpenGL.

Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
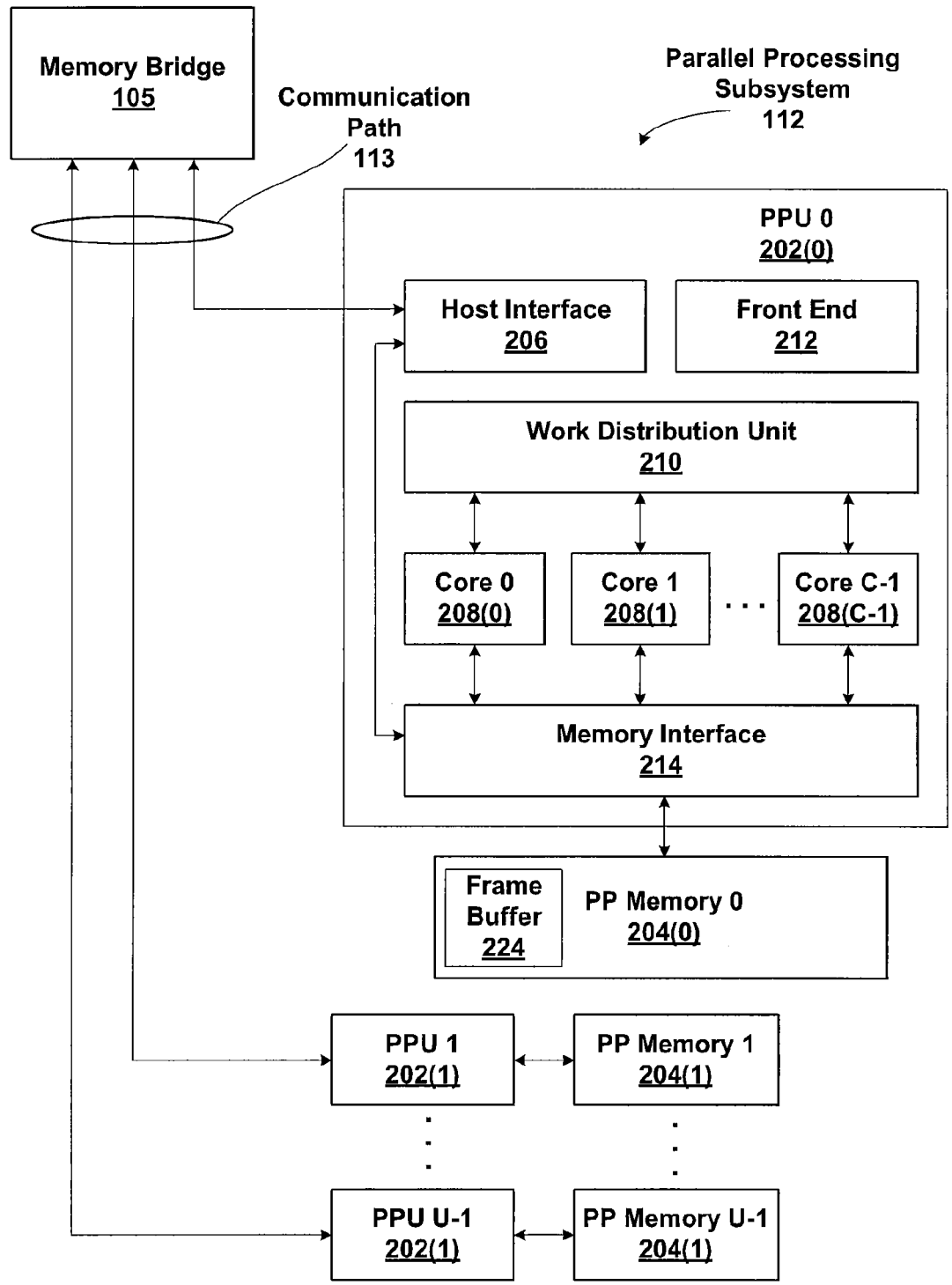
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. A frame buffer 224 that stores image data produced by each PPU 202 for display may be stored in each PP memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data read via memory bridge 105 and bus 113, interacting with local PP memory 204 (which can be used as graphics memory including, e.g., a conventional frame buffer, instruction stream buffer 224, texture maps, and the like) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1) which may be located in system memory 104, PP memory 204, or another storage location accessible to both CPU 102 and PPU 202.

PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs 202 in a multi-PPU system may be identical to or different from each other; for instance, different PPUs 202 might have different numbers of cores, different amounts of local PP memory, and so on. Where multiple PPUs 202 are present, they may be operated in parallel to process data at higher throughput than is possible with a single PPU 202.

Systems incorporating one or more PPUs 202 may be implemented in a variety of configurations and form factors, including desktop, laptop, or handheld personal computers, servers, workstations, game consoles, embedded systems, and so on.

Core Overview

Figure 3:
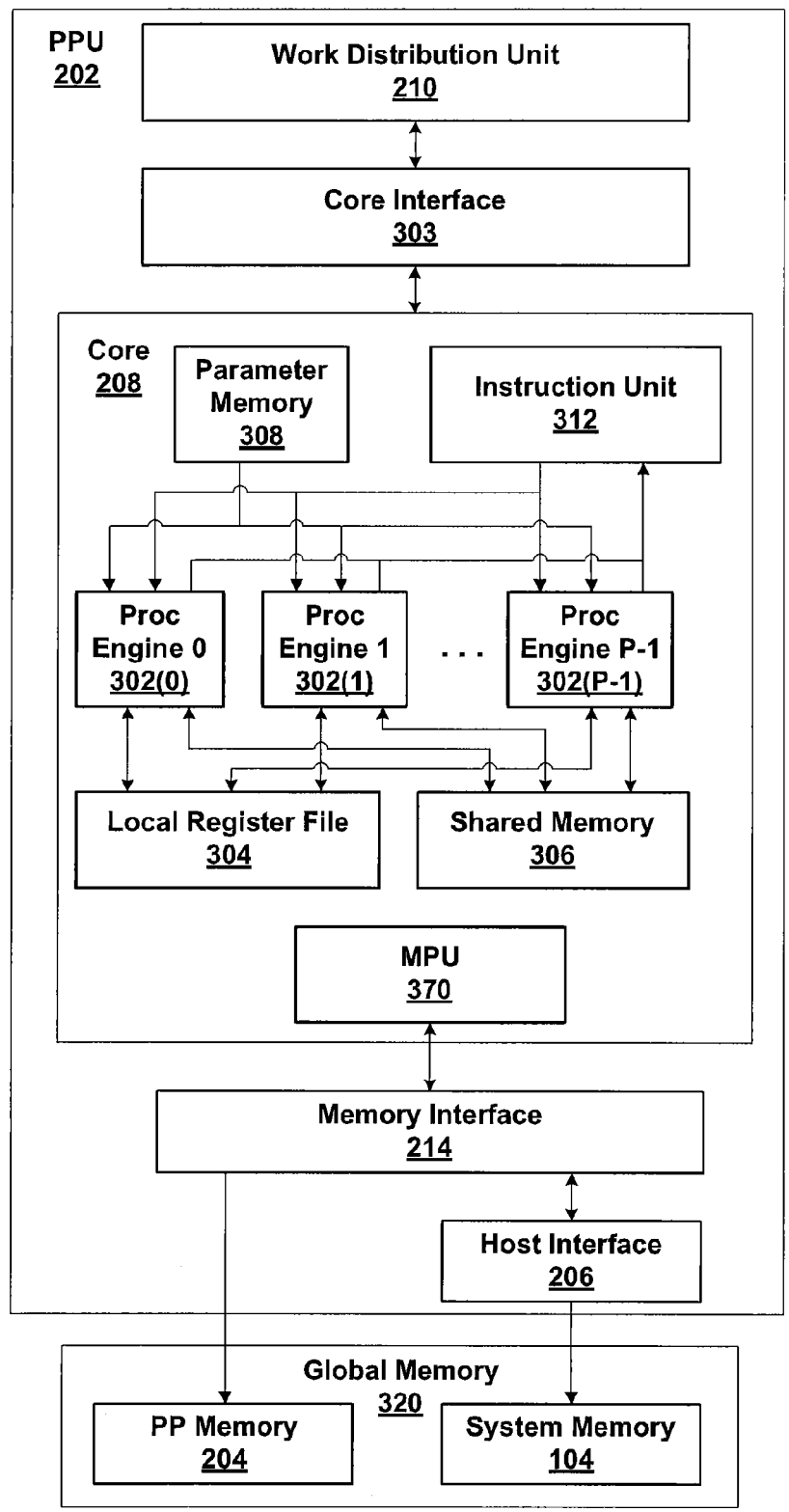
FIG. 3 is a block diagram of a parallel processing unit for the parallel processing subsystem of FIG. 2 in accordance with one or more aspects of the present invention.

FIG. 3 is a block diagram of a parallel processing unit 202 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a context, i.e., a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via a memory partition unit 370 that is coupled to memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory partition unit 370 via an interconnect (not explicitly shown) that allows any processing engine 302 to access global memory 320.

Memory partition unit 370 receives memory access requests from core 208 to read and write global memory 320 and returns data read from global memory 320 to core 208. In some embodiments of the present invention, multiple memory partition units 370 are included in core 208, with each memory partition unit 370 dedicated to processing memory access requests for a portion (partition) of the global memory. For example, when PP memory 204 includes multiple memory devices each memory partition unit 370 may correspond to one of the multiple memory devices. Memory partition unit 370 is configured to return acknowledge signals to core 208 that indicate a write request has completed processing and a read to the same address can proceed in order to read the data that was written. In a conventional system an acknowledge signal is returned when the write request is output to memory and the latency between when the write request is received and when it is output to memory can be several clock cycles as the write request passes through FIFOs and arbitration. Memory partition unit 370 is advantageously configured to return an early acknowledge signal under some conditions in order to reduce the read-write interlock latency, thereby allowing processing of a read request to proceed before a write request to the same address is output to memory, as described in conjunction with FIG. 5.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency. Since each thread may correspond to a different context, multiple contexts may be processed over multiple cycles as different threads are issued for each cycle.

Instruction unit 312 is configured such that, for any given processing cycle, an instruction (INSTR) is issued to each P processing engines 302. Each processing engine 302 may receive a different instruction for any given processing cycle when multiple contexts are being processed simultaneously. When all P processing engines 302 process a single context, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads for a single context or N*24 concurrent threads for each context, where N is the number of processing engines 302 allocated to the context.

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new context in instruction unit 312, then signals instruction unit 312 to begin executing the context. When execution of a context is completed, core 208 advantageously notifies core interface 303. Core interface 303 can then initiate other processes, e.g., to retrieve output data from shared memory 306 and/or to prepare core 208 for execution of additional contexts.

It will be appreciated that the core architecture described herein is illustrative and that variations and modifications are possible. Any number of processing engines may be included. In some embodiments, each processing engine 302 has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Graphics Pipeline Architecture

Figure 4:
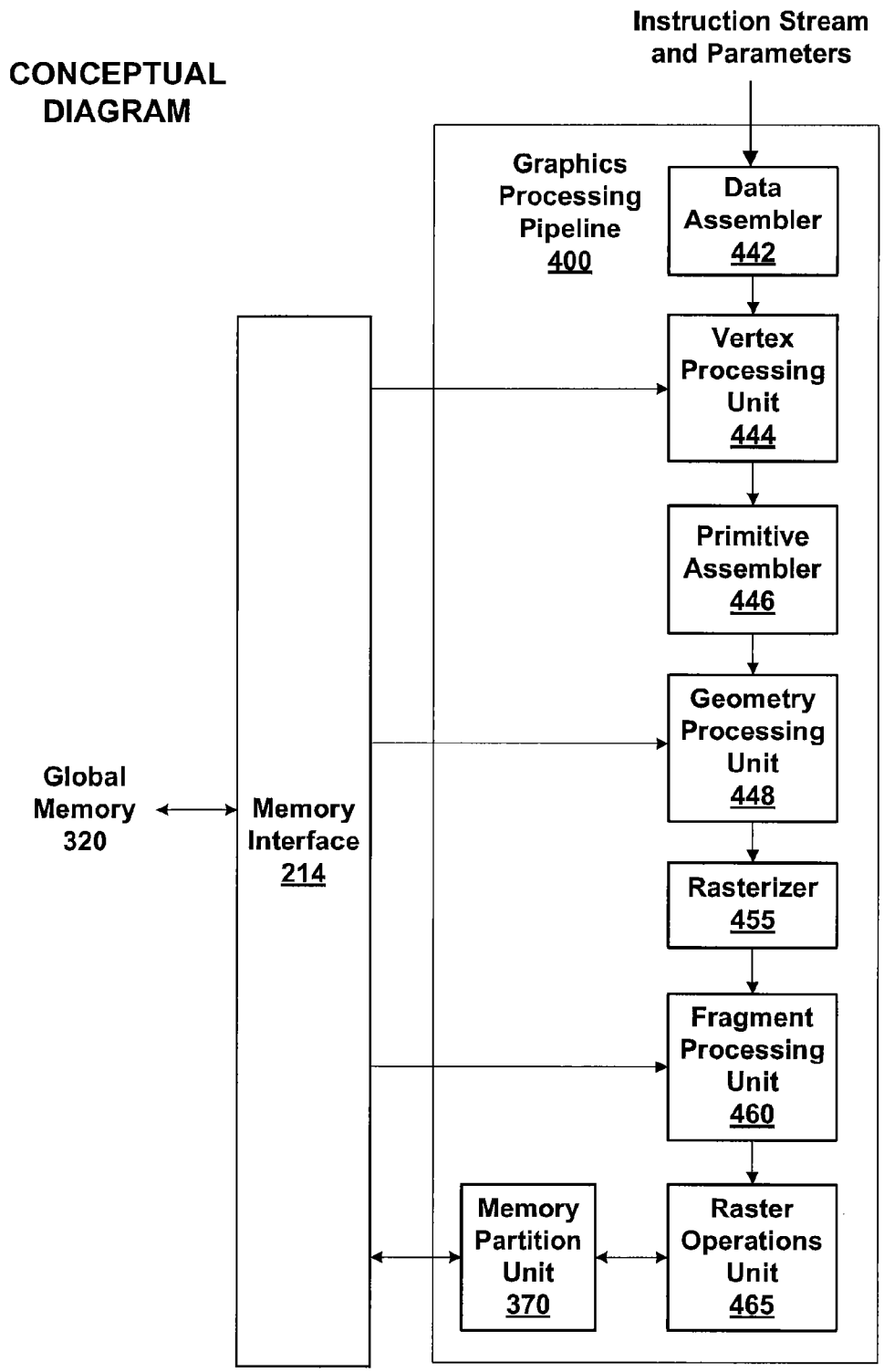
FIG. 4 is a conceptual diagram of a graphics processing pipeline in accordance with one or more aspects of the present invention.

FIG. 4 is a conceptual diagram of a graphics processing pipeline 400, in accordance with one or more aspects of the present invention. PPU 202 may be configured to form a graphics processing pipeline 400. For example core 208 may be configured to perform the functions of a vertex processing unit 444, geometry processing unit 448, and a fragment processing unit 460. The functions of data assembler 442, primitive assembler 446, rasterizer 455, and raster operations unit 465 may also be performed by core 208 or may be performed by host interface 206.

Data assembler 442 is a fixed function unit that collects vertex data for high-order surfaces, primitives, and the like, and outputs the vertex data to vertex processing unit 444. Vertex processing unit 444 is a programmable execution unit that is configured to execute vertex shader programs, transforming vertex data as specified by the vertex shader programs. For example, vertex processing unit 444 may be programmed to transform the vertex data from an object-based coordinate representation (object space) to an alternatively based coordinate system such as world space or normalized device coordinates (NDC) space. Vertex processing unit 444 may read data that is stored in PP memory 204 through memory interface 214 for use in processing the vertex data. In some embodiments of the present invention, vertex processing unit 444 reads data from global memory 320 through memory partition unit 370.

Primitive assembler 446 receives processed vertex data from vertex processing unit 444 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. Geometry processing unit 448 outputs the parameters and new graphics primitives to rasterizer 455. Geometry processing unit 448 may read data that is stored in PP memory 204 through memory interface 214 for use in processing the geometry data. In some embodiments of the present invention, geometry processing unit 448 reads data from global memory 320 through memory partition unit 370.

Rasterizer 455 scan converts the new graphics primitives and outputs fragments and coverage data to fragment processing unit 260. Fragment processing unit 460 is a programmable execution unit that is configured to execute fragment shader programs, transforming fragments received from rasterizer 455 as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in PP memory 204 through memory interface 214 for use in processing the fragment data. In some embodiments of the present invention, fragment processing unit 460 reads data from global memory 320 through memory partition unit 370. Memory interface 214 may be configured to decompress any compressed data and perform texture filtering operations, e.g., bilinear, trilinear, anisotropic, and the like.

Raster operations unit 465 is a fixed function unit that optionally performs near and far plane clipping and raster operations, such as stencil, z test, blending, and the like, and outputs pixel data as processed graphics data for storage in graphics memory. The processed graphics data may be stored in frame buffer 224 for display on display device 110. Operations such as blending and z test read memory locations and optionally write the same memory locations based on the result of the operation. Read-write interlocks are performed by raster operations unit 465 to avoid RAW hazards. Specifically, raster operations unit 465 compares read addresses with write addresses for write requests that have been output to memory partition unit 370 and not acknowledged by memory partition unit 370. Any read request whose address matches an unacknowledged write address is interlocked until the RAW is removed, i.e., the matching write address is acknowledged. Memory partition unit 370 is configured to provide an early acknowledge signal to raster operations unit 465 to reduce the read-write interlock latency. When other processing units, e.g. vertex processing unit 444, geometry processing unit 448, and fragment processing unit 460 output memory read requests via memory partition unit 370 those processing units receive a acknowledge signal when the write data is output to global memory 320.

Acknowledging Write Operations for Read-Write Interlocks

Figure 5:
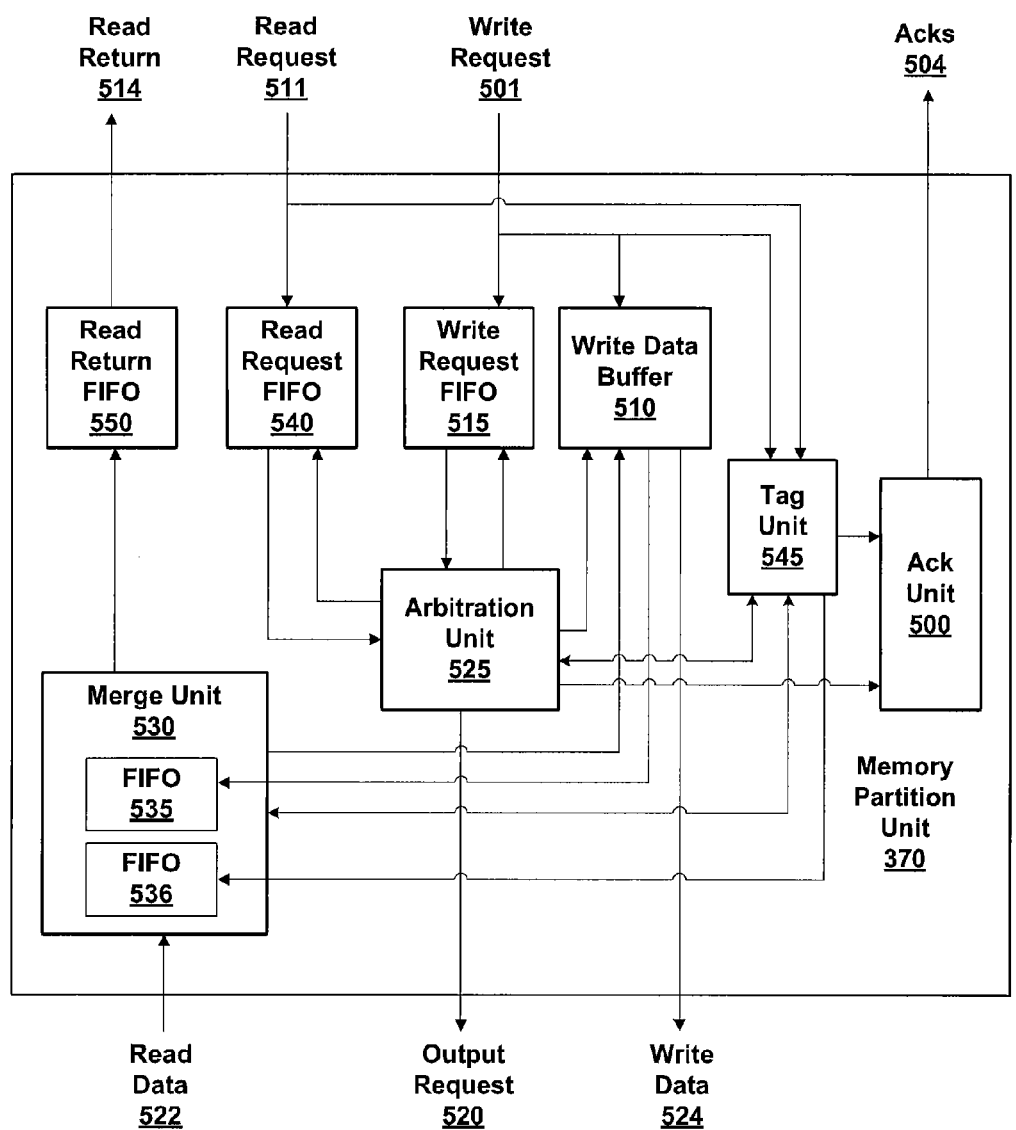
FIG. 5 is a block diagram of the memory partition unit 370 of FIG. 4 in accordance with one or more aspects of the present invention.

FIG. 5 is a block diagram of the memory partition unit 370 of FIG. 4, in accordance with one or more aspects of the present invention. The processing unit that provides read and write requests to memory partition unit 370 interlocks read requests whose address matches a previously output write request address until an acknowledge signal for the previously output write request is received from memory partition unit 370. Therefore, returning an early acknowledge signal to the processing unit reduces the read-write interlock latency.

Memory partition unit 370 receives inputs read request 511 and write request 501. Typically, read and write memory transactions match the size of a memory interface, i.e., the amount of data that is transferred in a clock cycle. A block represents the data that is transferred in a memory transaction. Read and write requests for sizes less than a block are performed by reading and writing the block that includes the data for the smaller request. Write request 501 accepts write addresses, write masks, and write data. Read and write requests specify an address of a block and a mask indicating which of eight 16-byte "subpackets" are to be read or written. In other embodiments of the present invention, the numbers of subpackets and bytes in a subpacket may vary. The length of a read or write request is effectively the number of bits that are asserted in the mask. The write masks may also include byte enables that indicate which bytes of the write data are valid for each subpacket. The write data and byte enables are stored in write data buffer 510 for output via write data 524 and for output to a merge unit 530. The write address and subpacket masks are stored in a write request FIFO 515 to queue the write request for output to memory. Similarly, a read request FIFO 540 queues read addresses and subpacket masks received at read request 511.

An arbitration unit 525 selects read and write requests for output via output request 520 by popping entries from read request FIFO 540 and write request FIFO 515. When a write request is selected, the corresponding write data that is stored in write data buffer 510 is popped from write data buffer 510 and the data is "committed" for output to memory via write data 524. Arbitration unit 525 may be of generally conventional design, and a detailed description is omitted as not being critical to the present invention.

A tag unit 545 stores the address for pending write requests, and the subpacket portion of the write mask that indicates which subpackets in a block are written, for each write request. When arbitration unit 525 pops an entry from write request FIFO 515, the corresponding entry in tag unit 545 is released since the write request has been committed to memory.

When a read request is received via read request 511, the read address is compared against the write request addresses stored in tag unit 545 and if there is no match, then there is a miss. Otherwise, there is a hit and a write to the same address is pending and there is a potential RAW hazard. When the pending write includes all of the data that will be read, then it is not necessary to read data from the memory since any data stored in memory will be replaced with the pending write data. Therefore, the read request can be cancelled. When the pending write is only a portion of the data that will be read, then it is necessary to read data from memory and merge the pending write data with the data read from memory to obtain the correct data for the read request. When a portion of the data is available as pending write data, the read request can be "trimmed" to avoid reading unneeded data. Tag unit 545 outputs a hit signal to a merge unit 530 in order to provide the pending write data for the read request. In some embodiments of the present invention, the read request is completed rather than cancelled, even when all of the data to be read is available in the pending write.

A merge unit 530 merges pending write data with read data returned from memory via read data 522. Tag unit 545 provides the location of the pending write data in write data buffer 510 and the write mask to merge unit 530. Merge unit 530 reads the pending write data from write data buffer 510. Since merge unit 530 may access the pending write data stored in write data buffer 510 in a different order than arbitration unit 525, i.e., an order that is different than the order that the requests were received by write data buffer, write data buffer 510 can also be randomly accessed. When merge unit 530 reads data from write data buffer 510, the entries storing the data are not freed up to store other data. As previously described, the entries of write data buffer 510 are popped in FIFO order by arbitration unit 525 when the write request is committed.

Merge unit 530 includes a FIFO 535 that is used to store the pending write data and byte mask portion of the write mask until any corresponding read data arrives via read data 522. Merge unit 530 also includes a FIFO 536 that is used to store merge information indicating whether or not pending write data should be merged with read data, i.e., whether or not data should be popped from FIFO 535. Tag unit 545 compares both the address and subpacket masks to generate a hit/miss and produce the merge information. The depths of FIFO 535 and FIFO 536 in merge unit 530 are sized so that the memory interface, read data 522 is not stalled to wait for pending write data. When read data is received via read data 522, the merge information is first popped from FIFO 536, and then if a merge is needed, the pending write data is popped from FIFO 535 and merged with the read data, according to the write mask. The merged data is output to read return FIFO 550. Read return FIFO 500 outputs the merged data to the unit that requested the data via read return 514.

When a write request is received via write request 501, the write address and subpacket mask are compared against the write request addresses and subpacket masks stored in tag unit 545 and if there is no match, then tag unit 545 outputs an early acknowledge to ack unit 500. When there is a match, indicating the write subpacket matches that of another pending write request, tag unit 545 outputs a late-early acknowledge to arbitration unit 525. Arbitration unit 525 will output the late-early acknowledge to ack unit 500 when the corresponding write request is committed to memory.

In embodiments of the present invention that combine sequential requests into larger write requests, tag unit 545 stores the original individual write request addresses. Write request FIFO 515 may be configured to combine two or more write requests into a larger write request to improve memory access efficiency.

Figure 6A:
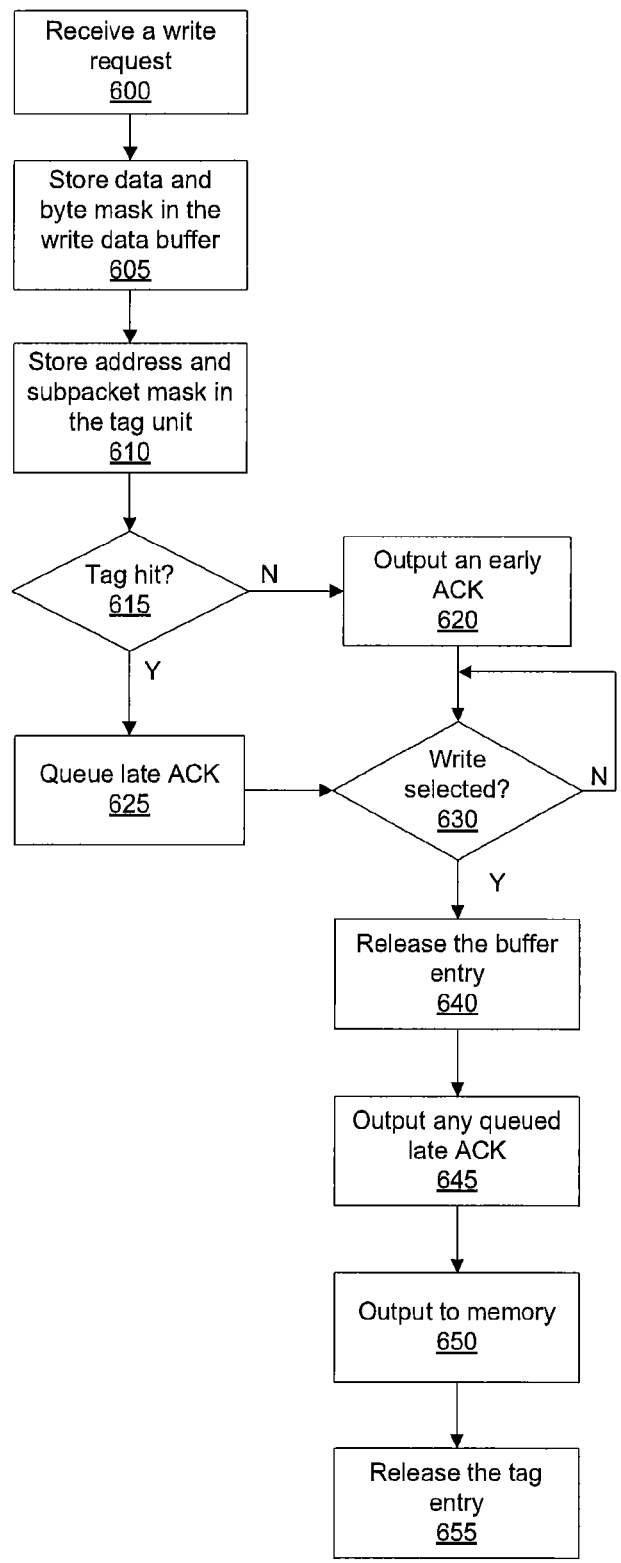
FIG. 6A is a flow diagram of method steps for processing a write request in accordance with one or more aspects of the present invention.

FIG. 6A is a flow diagram of method steps for processing a write request, in accordance with one or more aspects of the present invention. Although the method describes the steps for processing one write request, many write requests may be pipelined and processed in sequence. In step 600 memory partition unit 370 receives a write request. In step 605 the write data included in the write request and any byte enables are stored in write data buffer 510. In step 610 the address specified by the write request and write mask is stored in tag unit 545. The address and subpacket portion of the write mask for the request are stored in write request FIFO 515. In step 615, tag unit 545 determines if the write address and subpacket mask results in a hit. If there is a hit, then in step 625 tag unit 545 queues a late acknowledge by outputting a late acknowledge for the write request to arbitration unit 525 and proceeds to step 630. Otherwise, in step 620 tag unit 545 outputs an early acknowledge to ack unit 500 and ack unit 500 outputs the early acknowledge to the processing unit that submitted the write request.

In step 630 tag unit 545 determines if the write request has been selected and committed to memory by arbitration unit 525. Tag unit 545 repeats step 630 until the write request is committed to memory by arbitration unit 525, and then, in step 640 arbitration unit 525 pops the write data from write data buffer 510 to release the buffer entry (or entries). In step 645 arbitration unit 525 outputs a queued late acknowledge for the write request (if one exists). In step 650 arbitration unit 525 outputs the write request to memory via 520. In step 655 tag unit 545 releases the tag entry that stored the address and write mask corresponding to the committed write request.

Figure 6B:
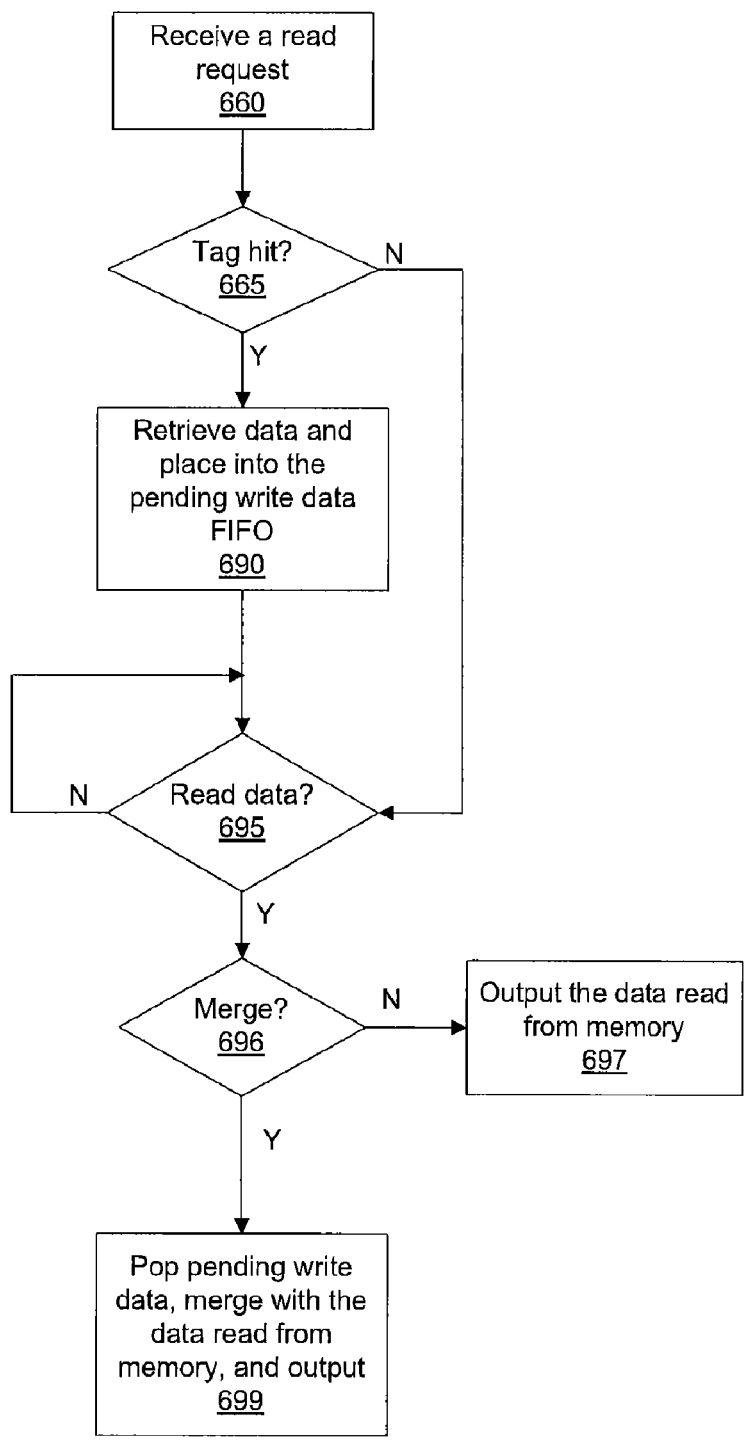
FIG. 6B is a flow diagram of method steps for processing a read request in accordance with one or more aspects of the present invention.

FIG. 6B is a flow diagram of method steps for processing a read request, in accordance with one or more aspects of the present invention. In step 660 memory partition unit 370 receives a read request via read request 511. In step 665 tag unit 545 determines if any of the subpackets specified by the read request is stored in tag unit 545, i.e., if there is a hit. If there is not a hit, then there is not a pending write and the method proceeds to step 695. In some embodiments of the present invention, tag unit 545 determines if the read can be cancelled. A read request can be cancelled when all of the bytes that will be read will be written by a pending write request.

If, in step 665 tag unit 545 determines that there is a hit, then in step 690 tag unit 545 reads the pending write data that is specified by the read request and places the pending write data and write mask in FIFO 535 within merge unit 530. In step 695 merge unit 530 waits for the read data specified by the read request to arrive via read data 522. When the read data arrives, in step 696 merge unit 530 pops the merge information from FIFO 536 and determines if any pending write data stored in FIFO 535 should be merged with the read data. If merge unit 530 determines that no merge is needed, then in step 697, merge unit outputs the read data to return FIFO 550 to fulfill the read request. Otherwise, in step 699 merge unit 530 pops any pending write data for the read request from FIFO 535 and merges the pending write data with the read data according to the read and write byte enables and outputs the merged data to read return FIFO 550 to fulfill the read request.

Figure 7:
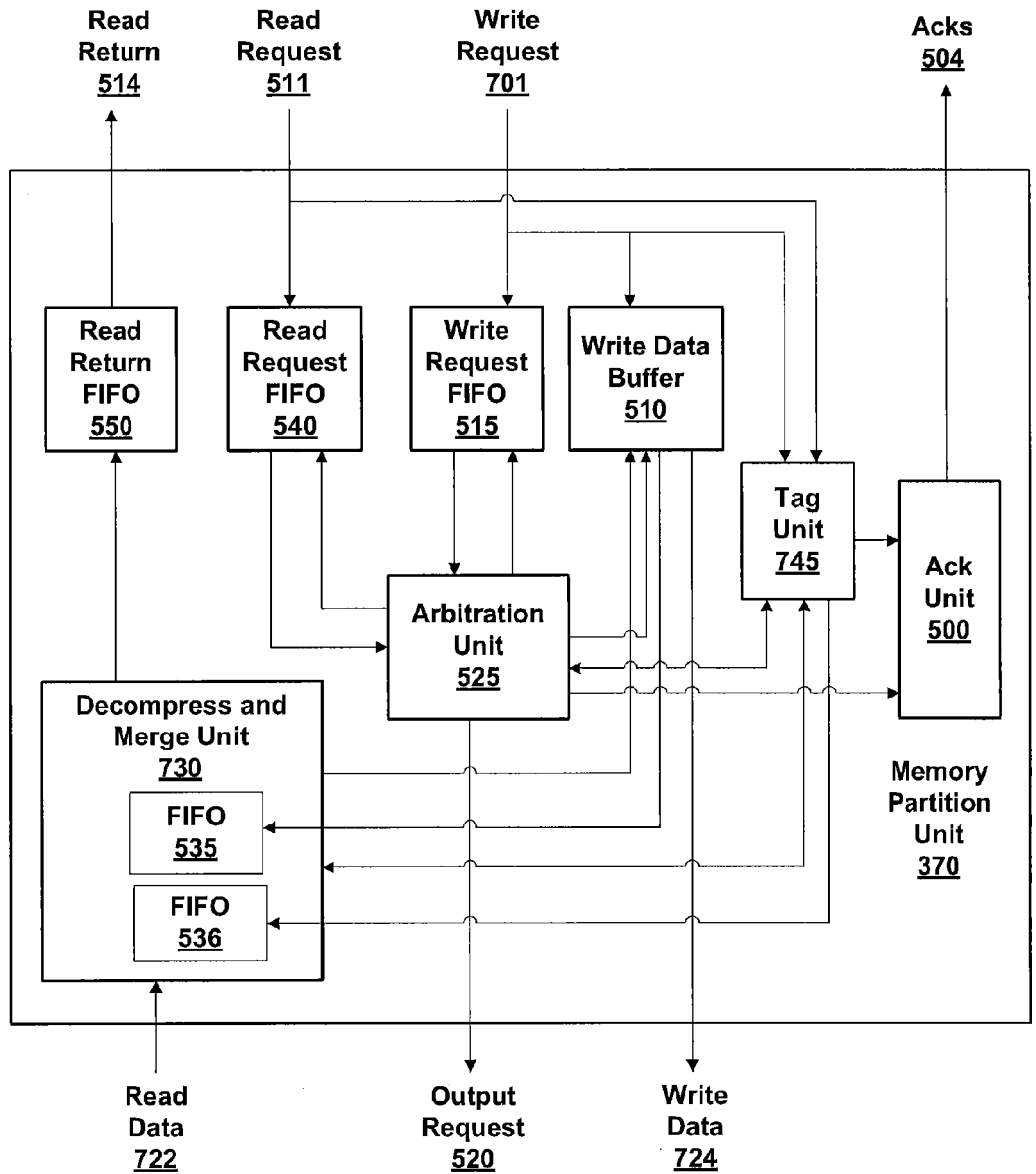
FIG. 7 is another block diagram of the memory partition unit 370 of FIG. 4 in accordance with one or more aspects of the present invention.

FIG. 7 is another block diagram of memory partition unit 370 of FIGS. 3 and 4, respectively, in accordance with one or more aspects of the present invention. When compression is used to reduce the memory needed to store the data, write requests may include data represented in either a compressed or uncompressed format. A block of data that is stored in memory may also be represented in either a compressed or uncompressed format. Write request 701 includes format information indicating whether or not the write data is compressed or uncompressed. A tag unit 745 performs the operations of tag unit 545 and stores the format information for each write request. A decompress and merge unit 730 decompresses read data received via read data 722 that is compressed. Decompress and merge unit 730 may also be configured to decompress pending write data before it is merged with decompressed read data.

Figure 8:
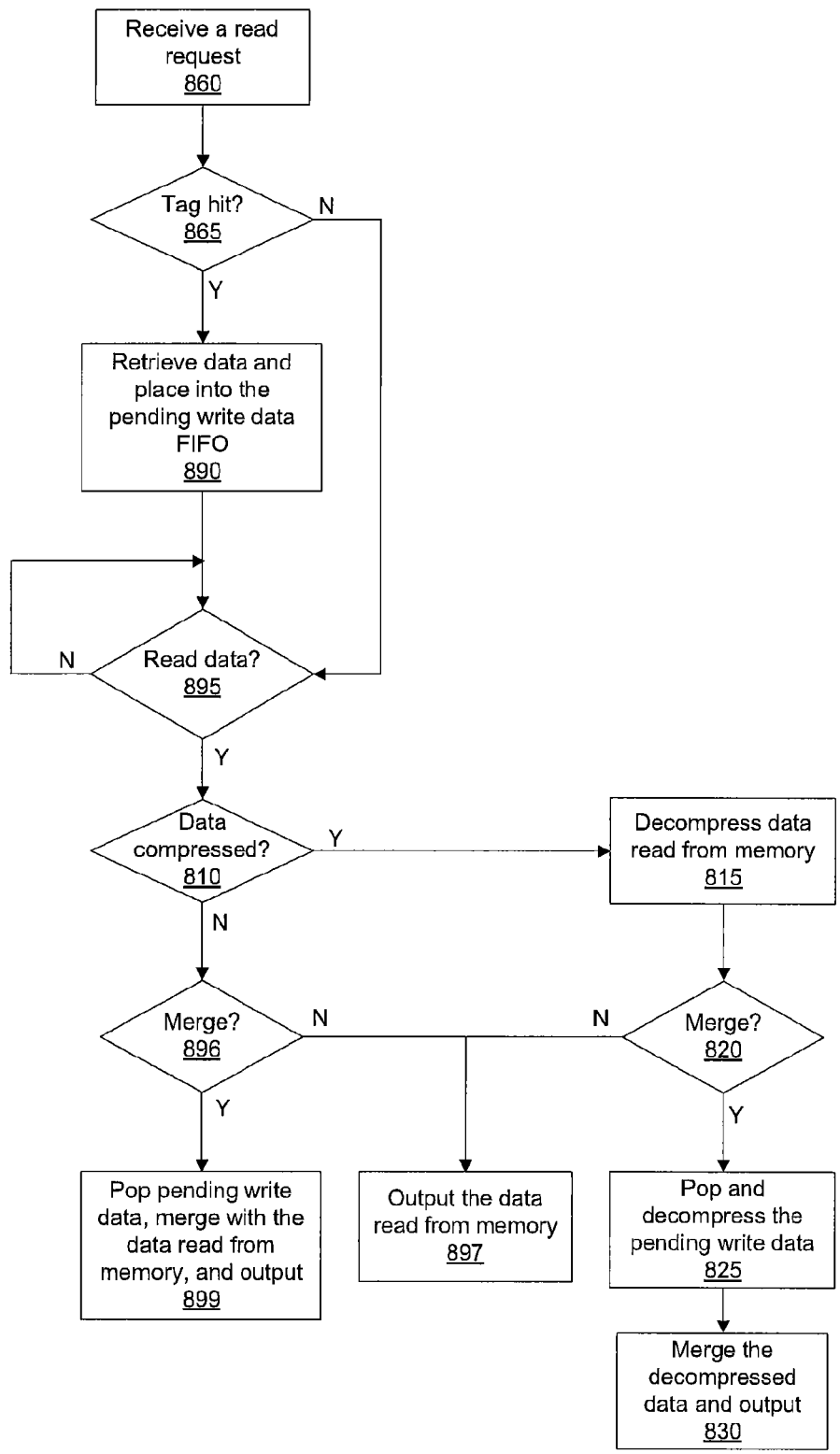
FIG. 8 is a flow diagram of method steps for processing a read request when compression is used in accordance with one or more aspects of the present invention.

FIG. 8 is a flow diagram of method steps for processing a read request when compression is used, in accordance with one or more aspects of the present invention. Steps 860, 865, 890, and 895 correspond to steps 660, 665, 690, and 695 of FIG. 6B, and are performed as previously described. In step 810 decompress and merge unit 730 determines if the read data is compressed, and, if not decompress and merge unit 730 proceeds to step 896 and pops the merge information from FIFO 536 and determines if any pending write data stored in FIFO 535 should be merged with the read data. If decompress and merge unit 730 determines that no merge is needed, then in step 897, merge unit outputs the read data to return FIFO 550 to fulfill the read request. Otherwise, in step 899 merge unit 730 pops the pending write data from FIFO 585, merges the read data with the pending write data, and outputs the merged data to fulfill the read request.

If, in step 810 decompress and merge unit 730 determines that the read data is compressed, then in step 815 decompress and merge unit 730 decompresses the data read from memory and then proceeds to step 820. In step 820, decompress and merge unit 730 pops the merge information from FIFO 536 and determines if any pending write data stored in FIFO 535 should be merged with the decompressed read data. If decompress and merge unit 730 determines that no merge is needed, then in step 897, decompress and merge unit 730 outputs the read data to return FIFO 550 to fulfill the read request. Otherwise, in step 825, decompress and merge unit 730 pops the pending write data from FIFO 585 and decompresses the write data. In step 830 decompress and merge unit 730 merges the decompressed read data with the decompressed pending write data and outputs the merged data to fulfill the read request.

Memory partition unit 370 improves memory access performance by minimizing the latency needed to avoid a RAW hazard when a read follows a write to the same memory location. Providing an early acknowledgement signal indicating that a subsequent read can proceed when a write to the memory location is queued for output to the memory allows the read request to pass the write request rather than waiting until the write data is committed to memory. When only a portion of the data specified by the read request is queued, the read request passes the write request and accesses memory to obtain any data that is not queued in memory partition unit 370. Memory partition unit 370 then merges the portion of data with the data read from memory to return the current data for the read request. In either case, the latency of read after write interlocks is reduced and memory transaction throughput may be improved. When data stored in the memory can be represented in a compressed format, memory partition unit 370 decompresses data read from memory that is compressed before merging with the queued write data.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for reducing read-write interlock latency, comprising:
   receiving a first write request from a processing unit that specifies a memory location and write data;
   storing the memory location in a tag storage resource configured to store only pending write requests;
   storing the write data as pending write data in an buffer entry of a write data buffer;
   comparing the memory location to any other memory locations for pending write requests that are stored in the tag storage resource; and either
   outputting an early acknowledgement signal to the processing unit when the memory location does not match another memory location for a pending write request that is stored in the tag storage resource, the early acknowledgement signal indicating that a read request for the memory location can be processed before the pending write data is stored in the memory location or
   queuing a late early acknowledgement signal to interlock any read request specifying the memory location when the memory location does match another memory location for a pending write request that is stored in the tag storage resource,
   outputting the late early acknowledgment to the processing unit when the first write request is committed to memory, the late early acknowledgment indicating that a read request for the memory location can be processed, and
   removing the pending write data from the buffer to release the buffer entry.

2. The method of claim 1, further comprising the steps of:
   receiving a read request that specifies the memory location, wherein the read request is received from one of a vertex processing unit, geometry processing unit, and fragment processing unit and the write request is received from a raster operations unit that writes pixel data; and
   retrieving the pending write data from the write data buffer.

3. The method of claim 1, further comprising the step of outputting the pending write data as read data to fulfill a read request when the pending write data stored in the write data buffer includes all read data specified by a sub-packet mask provided with the read request.

4. The method of claim 3, further comprising the step of canceling a memory read transaction to avoid accessing the memory location in order to obtain the read data specified by the read request.

5. The method of claim 1, further comprising the steps of storing a write mask specified by the write request in a tag storage resource, wherein the write mask indicates which sub-packets in a block specified by the memory location should be written with the write data.

6. The method of claim 1, further comprising the steps of:
   receiving a read request that specifies the memory location;
   reading the memory location to obtain read data before the pending write data is stored in the memory location;
   merging the pending write data with the read data to produce merged data and fulfill the read request based on a write mask when at least a portion of the pending write data is specified by the read request, wherein the write mask indicates which sub-packets in a block specified by the memory location should be written with the write data; and
   outputting the merged data to fulfill the read request.

7. The method of claim 6, further comprising the steps of:
   determining that the read data is stored in a compressed format; and
   decompressing the read data before merging the read data with the pending write data.

8. The method of claim 1, further comprising the steps of:
   committing the write request to memory;
   popping the pending write data from the write buffer; and
   releasing an entry in the tag storage resource that stores the memory location.

9. The method of claim 1, wherein the memory location is an address in a frame buffer that stores image data suitable for display.

10. A system for reducing read-write interlock latency, comprising:
   a memory partition unit configured to output acknowledge signals that indicate a write request for a memory location has been processed and the memory location can be read, the memory partition unit including:
      a write data buffer configured to store write data that is specified by write requests as pending write data in a buffer entry;
      a tag storage resource configured to:
         store only memory locations that are specified by the write requests received from a processing unit,
         compare the new memory location for a received memory request to any other memory locations for pending write requests that are stored in the tag storage resource, and either
         output an early acknowledgement signal to the processing unit when the new memory location does not match another memory location for a pending write request that is stored in the tag storage resource, the early acknowledgement signal indicating a read request for the memory location can be processed before the pending write data is stored in the memory location to reduce the read-write interlock latency; or
         queue a late early acknowledgement signal to interlock any read request specifying the new memory location when the new memory location does match another memory location for a pending write request that is stored in the tag storage resource, output the late early acknowledgment to the processing unit when the received write request is committed to memory, the late early acknowledgment indicating that a read request for the memory location can be processed, and remove the pending write data from the write data buffer to release the buffer entry; and an arbitration unit coupled to the write data buffer and the tag storage resource and configured to select and output read and write requests to memory.

11. The system of claim 10, further comprising a merge unit coupled to the tag storage resource and configured to read pending write data for read requests from the write data buffer and to store pending write data, wherein the tag storage resource is further configured to:

receive a first memory location specified by a read request and determine if the first memory location is stored in the tag storage resource, wherein the read request is received from one of a vertex processing unit, geometry processing unit, and fragment processing unit and the write request is received from a raster operations unit that writes pixel data; and output the first memory location to the merge unit for reading the pending write data for the first memory location from the write data buffer when the first memory location is stored in the tag storage resource.

12. The system of claim 10, wherein the tag storage resource is further configured to cancel a memory read transaction to avoid accessing the new memory location to fulfill a read request when the pending write data for the new memory location includes all read data specified by the read request.

13. The system of claim 10, wherein the tag storage resource is further configured to store write masks specified by the write requests, wherein each one of the write masks indicates which sub-packets in a block specified by the new memory location should be written with the write data.

14. The system of claim 10, further comprising a merge unit coupled to the tag storage resource and configured to:

receive a read request that specifies the new memory location;

read the new memory location to obtain read data specified by the read request before the pending write data is stored in the new memory location;

merge the pending write data for the new memory location with the read data to produce merged data and fulfill the read request based on a write mask when at least a portion of the pending write data is specified by the read request, wherein the write mask indicates which sub-packets in a block specified by the first memory location should be written with the pending write data; and output the merged data to fulfill the read request.

15. The system of claim 11, wherein the merge unit is further configured to decompress the read data before merging the read data with the pending write data when the read data is stored in a compressed format.

16. The system of claim 10, wherein the arbitration unit is further configured to:

commit a write request to memory;

pop the pending write data for the write request from the write buffer; and release an entry in the tag storage resource that stores a memory location for the write request.

17. The system of claim 10, wherein the memory locations are addresses in a frame buffer that stores image data suitable for display.

18. The system of claim 11, further comprising the step of outputting the pending write data as read data to fulfill the read request when the pending write data stored in the write data buffer includes all read data specified by a sub-packet mask provided with the read request.

19. The method of claim 1, further comprising the steps of:

receiving a read request that specifies the memory location associated with a first portion and a second portion of data, wherein the first portion is pending write data and the second portion is not pending write data;

reading the first portion of the pending write data; and trimming the read request to avoid reading the second portion of data.

20. The system of claim 10, wherein the memory partition unit is further configured to:

receive a read request that specifies the memory location associated with a first portion and a second portion of data, wherein the first portion is pending write data and the second portion is not pending write data;

read the first portion of the pending write data; and trim the read request to avoid reading the second portion of data.

* * * * *